May 8, 1962  A. F. KAIN  3,033,352

CONVEYOR IDLER MOUNTING MEANS AND SUPPORT

Filed Nov. 13, 1959

Arthur F. Kain
INVENTOR.

BY
ATTORNEY

United States Patent Office 3,033,352
Patented May 8, 1962

---

3,033,352
CONVEYOR IDLER MOUNTING MEANS
AND SUPPORT
Arthur F. Kain, Mulberry, Fla.
Filed Nov. 13, 1959, Ser. No. 852,881
6 Claims. (Cl. 198—192)

This invention relates to means for supporting and mounting troughing idlers for belt conveyors and is here shown and more particularly adapted for the support and mounting of flexible troughing idlers of the suspension type.

Among the more recent and highly significant developments in the art of belt conveyors is that of the flexible troughing idlers of the suspension type. Such idlers have achieved outstanding commercial success as substitutes for the previously conventional type of troughing idlers consisting of a plurality of angularly related rigid rollers mounted on fixed axes and without means for adapting the elevation of the ends of the outer rollers or the relative axial angularity between the rollers. One example of the flexible, suspension type, troughing rollers is disclosed in the patent to George Baecheli, No. 2,876,890, issued March 10, 1959. The invention of this patent is currently manufactured and distributed under the trade name of "Limberoller" and constitutes an element of a conveyor distributed under the trade name "Limberope." The above patent is assigned to the Joy Manufacturing Company of Pittsburgh, Pennsylvania, manufacturers of the "Limberoller" and the "Limberope" conveyor.

In the use of all types of troughing idlers for conveyor belts, provision for a vertical adjustment of the outer ends of the idlers is advantageous. The location of the supported ends of the idlers, whether multiple rigid rollers or flexible idlers, determines the curvature, or catenary of the trough formed by the conveyor belt. Variations in the type of material to be conveyed frequently call for various trough depths and curvatures. In installations using the previously conventional composite troughing idler formed of individually rotatable rolls, adjustment of the outer ends of the outer rolls was seldom provided for. The desired degree of troughing was determined by the angularity of the axis of the end rolls with respect to the permanently horizontal axis of the intermediate rolls. Since the rolls had rigid inflexible axes, adjustment of the ends to vary troughing curvatures is of necessity on a radius determined by the roller length.

With the advent of the flexible, suspension type troughing idlers, such as set forth in the aforementioned patent, adjustment of the suspension point became more feasible. Since the arc of adjustment is not necessarily limited to a true radius, variations in end locations can be varied to produce catenaries of widely varying parabolas.

An important consideration in the matter of variations of trough characteristics of conveyors is that the height of the lowest point in the trough from a base plane thereunder should remain constant. This height is known as the "D" distance. This is obviously important since undesirable dips would otherwise occur in the general plane of conveyor movement. If idler roller ends, regardless of type, were adjusted by mere vertical movement, this "D" distance would necessarily be altered without change in troughing characteristics. Similarly, if the vertical plane remained constant and the ends were moved inwardly, the belt would sag, diminishing the "D" distance. As noted above, where the idler is of the three rigid roll type, end adjustment of the rolls is limited to movement in an arcuate path on a radius equal to the length of the end rolls if the "D" distance is to remain constant.

Actual installations of the present invention have indicated that a preferable adjustment of the ends of the idler to modulate troughing without alteration of the "D" distance is along an irregular path to provide lateral displacement of the ends as an incident to vertical displacement, but not in a simple arc of fixed radius. A study of the troughing curvatures responsive to end adjustments of flexible idlers indicates that, a movement in a curved path of travel, approximating but progressively deviating from an arc having a center approximately at the center of the belt and a radius approximately equal to one-half the belt width may be appropriate for initial adjustments of the ends inwardly and upwardly from a horizontal belt position to a position in the nature of 20 degrees from the horizontal. However the line of movement should have a greater inward lateral component in relation to the vertical as the adjustment progresses to a mid position where the end position is approximately 45 degrees from the horizontal. In installations where the catenary has been altered without change in the "D" distance by movement of the ends from 20 to 45 degress, the plotting of the path of positions of the supports follows an irregular very mild curve almost approaching a straight line. Upwardly, beyond 45 degrees the curvature should probably gradually return to a true arc. However, since in practice, location of the ends in a plane greater than 50 to 55 degrees from the horizontal, seldom are required, the curvature above the 45 degree position is not deemed critical.

While the above holds true for troughing idlers of exact length, it has been found that in the assembly of the idlers of the general type of the aforementioned patent, exact lengths are seldom obtainable. In this and like structures the actual idler length is determined by the setting of threaded assembly elements. The human element in the manual assembly of the idler parts is such that slight but highly important variations in length repeatedly occur because of individual differences in the adjustment of the threaded parts. An important feature of the present invention is the ability of the present support to individually compensate for these length variations while maintaining a uniform "D" distance and catenary between idlers.

It is, therefore, among the primary objects of the present invention to provide an adjustable support for the outer extremities of idler rollers for conveyor belts. More particularly, it is the object of the present invention to provide adjustable supports for the outer ends of flexible suspension type troughing idlers for conveyors. A further and important object of the present invention is to provide an adjustable support for idler rollers by which lateral adjustment may be automatically affected as an incident to vertical adjustment. These and numerous other objects, features and advantages of the present invention will be apparent from a consideration of the following specification taken in conjunction with the accompanying drawings.

In one form of the invention as here shown by way of illustration, the ends of a flexible suspension type troughing idler are supported by vertically adjustable sleeves mounted in fixed tubular standards. An important feature of the invention is that the sleeve and standards are of axially curved configuration so as to affect a lateral displacement of the ends in consequence of the vertical adjustment thereof. While the invention contemplates the formation of the telescopic members as truly arcuate, an important feature of the invention is the formation of these members with a curvature of irregular form. This form is, generally speaking, of decreasing radius upwardly from the lower end of the sleeve. A curved form of generally logarithmic characteristics is indicated. This feature is significant in that it has been found through trial and error that the desired inward component of the movement in relation to the vertical under movement should preferably diminish with increased vertical displacement. The desirability of this characteristic curvature may be understood when it is recognized that the curvature of the conveyor belt is generally parabolic and constitutes a catenary. Hence, as the sides of the trough of the conveyor are forced upwardly by the troughing idler, the component of inward displacement should decrease as the sides move upwardly. In these considerations, it should be understood that it is highly desirable that the "D" distance, denoting the spacing of the lowest portion of the troughing conveyor from the base surface thereunder, should be retained.

It is, of course, recognized that interfitting or telescopic sections of irregular curvature cannot readily interfit without a clearance sufficient to compensate for the irregularities of the curvatures and to permit the mild irregular curvature required between angularities of 20 to 45 degrees as discussed above. Not only is such clearance provided in the present structure, but an additional ample leeway is incorporated whereby the sleeve is but loosely fitted within the standard. A feature of the invention is the provision of adjustable means for taking up the play between sleeve and standard. As here shown, these means are oppositely disposed set screws. By engaging these screws carried by the standard against the sleeve, the sleeve may be retained in fixed relation to the standard. Furthermore, by oppositely adjusting such screws, the sleeve may be canted within the standard to pivot for tailored location of each roller end support thus not only accommodating the irregular path of travel to maintain a constant "D" distance but to compensate for variations in idler lengths. In practice, after proper adjustment is affected, the sleeves are preferably welded to the standard to insure a permanently rigid structure.

It is to be noted that while the present commercially successful embodiment of the invention utilizes the sleeve and hollow standard construction here illustrated, the inventive concept may be carried out by other constructions where adjustable interrelation departs from the telescopic structure depicted, as for instance, slidably adjustable plates or angle irons. FIGURE 4 of the drawings presents a form of the invention in which the desirable adjustment may be achieved by interaction between a non-tubular standard and an interfitting support member. The curvature of a slot in the standard, through which guide elements extend, provides for the desired simultaneous vertical and lateral adjustment of the idler ends in right angularly related planes, i.e. the vertical and horizontal.

Figure 1:
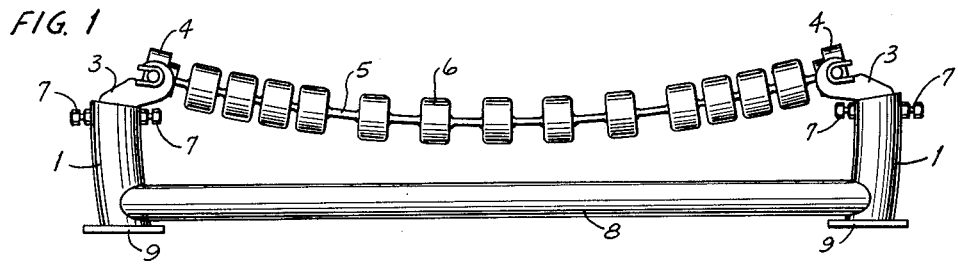
FIGURE 1 is a side elevation of one preferred embodiment of the present invention.
Figure 2:
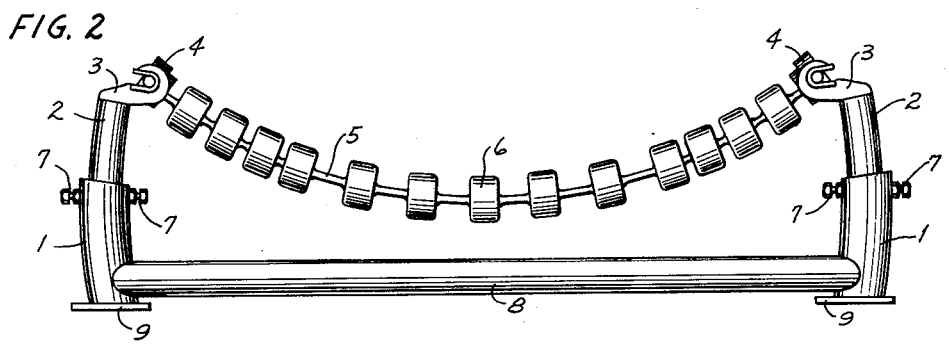
FIGURE 2 is a similar elevation illustrating a different adjustment of the support.
Figure 3:
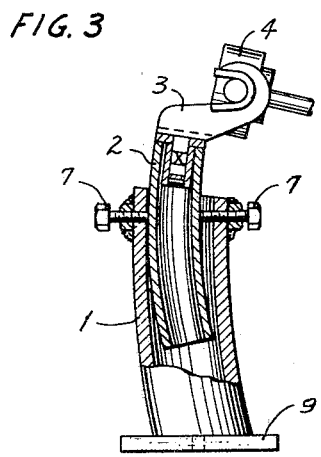
FIGURE 3 is a fragmentary sectional view of one of the supports depicted in FIGURES 1 and 2.

As presented by FIGURES 1, 2 and 3 of the drawings showing one commercially successful adaptation of the present invention, the standard of hollow curvilinear form is indicated by the numeral 1. Into this standard is telescopically but loosely fitted, a sleeve 2, provided with a swivel mounted bifuracted stirrup type head 3 which receives the side pintles of a terminal rotary bearing 4 of a conveyor idler generally indicated by the numeral 5. The idler is here shown as of the type disclosed in the aforementioned prior Patent No. 2,876,890 and may be defined as a suspension type flexible troughing idler. In this form of idler, the body is of an integral, elastomer composition including integral discs or rollers 6. It is to be specifically understood, however, that the present invention is in no way restricted to this particular type of idler and as hereinbefore stated, the idler may be of any structure, design or composition. While the invention is admirably suited to the use of suspension type, flexible idlers as herein depicted, it is to be further understood that the inventive concept by which adjustment of the idler support may provide for an alteration of the belt catenary without disturbing the "D" distance, it may be equally effective in supporting idlers of entirely different construction and design with the same advantageous characteristics of adjustment.

As noted by comparison between FIGURES 1 and 2, the telescopic adjustment of the sleeve 2 within the standard 1 may provide for variations in the curvature of the belt supported by the idler without alteration of the "D" distance. Thus, by elevating the sleeve 2 within the standard 1, the point of suspension of the ends of the idler may be raised and in so raising such point of suspension, the lateral disposition of the point of suspension is moved inwardly as an incident to such elevation or vice versa. Thus, while the catenary of the idler is altered, the "D" distance may be maintained.

It will, of course, be recognized that an elevation of the ends with co-incident inward movement of the point of suspension, may be achieved through the use of interfitting arcuate telescopic elements or a simple pivotal movement of the supporting arm with respect to its base, such movements will be along a purely arcuate path. As hereinbefore discussed, such arcuate movement of the point of suspension will not affect a change in catenary without a corresponding and objectional change in the "D" distance. The present invention provides for an adjustment of the point of suspension along an irregular path of movement by providing, in that form of the invention shown in FIGURES 1, 2 and 3, a substantially reduced diameter for the curved sleeve 2 with respect to the internal diameter of the standard 1. In setting up that form of the invention shown in FIGURES 1, 2 and 3, after having located the point of suspension as desired by telescopic movement of the sleeve 2 with respect to the standard 1 and by a relative tilting movement therebetween, set screws 7 are threadedly adjusted through the standard 1 to engage the inner and outer sides of the sleeve 2 to secure the sleeve in the desired, adjusted position. Since the disparity between external and internal diameters of the sleeve 2 and the standard 1 respectively, permit a substantial play therebetween, it will be understood that the curvilinear characteristics of such external and internal diameters may, therefore, not necessarily be in a true arc in either instance. However, such disparities may permit arcuate configurations of either or both standard and sleeve. A non-arcuate curve is, however, preferable and in order to accommodate a diminishing inward component of movement as an incident to vertical adjustment, both curvatures are preferably of altering radius as here depicted.

In some commercially successful installations of that form of the invention presented in FIGURES 1 to 3, it has been found desirable to weld the sleeve 2 to the standard 1 after the desired adjustment has been accomplished. The structure, therefore, permits ease of original adjustment through a trial and error method of locating the point of suspension and a securement of the sleeve within the standard by the set screws. To sustain such located point of adjustment and for the provision of a rigid and permanent maintenance of the sleeve to standard relationship through long periods of rugged use, welding may be desired. The play between the sleeve and standard under control of the set screws, before welding, permits the desired movement of the ends between 20 and 45 degrees, as well as compensating for varying idler lengths.

Figure 4:
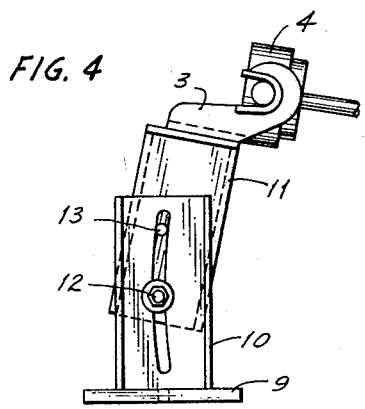
FIGURE 4 is a side elevation of a modified form of the invention.

In that form of the invention illustrated in FIGURE 4, there is presented an alternative structure by which the same type of adjustment of the point of suspension may be achieved without the use of tubular and telescopically adjusted elements. In that form of the invention, the standard is supported, as for instance, by a base supported flange 9. Such standards being adapted for interconnection in pairs through a bar 8 as shown in FIGURES 1 and 2. In FIGURE 4, this standard is in the form of an upright, preferably of angle configuration for strength. The supporting element is indicated by the numeral 11 as being of similar flat and preferably angle construction. The standard 10 is provided with an arcuate slot through which a bolt 12 interconnects the standard with the support element 11. A guide stud 13 is also provided for the support element 11 extending into the slot whereby cooperation between the bolt 12 and the stud 13 provides for an elevation of the supporting member 11 with respect to the standard in such manner as to adjust the point of suspension along a curvilinear path other than arcuate as and for the purpose herein set forth with respect to the structure depicted in FIGURES 1, 2 and 3.

From the foregoing, it will be seen that the present invention provides a novel, simple and improved means by which the idler rollers of a conveyor may be located in such position as to adjust the catenary of the roller and its supported conveyor belt without any substantial alteration of the "D" distance and for compensating for length variations. The primary inventive concept is to provide for such alteration in a manner by which vertical adjustment is automatically accomplished by an accompanying lateral adjustment not only incidental to, but in fact, as a necessary incident to such vertical adjustment and vice versa. As represented by the structural differentiations between FIGURES 1, 2, 3 and FIGURE 4, it will be seen that the invention is not limited nor restricted to the structural details herein set forth and while the telescopic arrangement of FIGURES 1, 2 and 3 is at present, the commercially successful form of the invention, it will, of course, be understood that numerous changes, modifications and the full use of equivalents may be resorted to without departure from the spirit or scope of the invention as set forth in the appended claims.

What I claim is:

1. A conveyor idler mounting means including a base, a conveyor support, and an irregularly curved means of upwardly increasing radius for adjustably securing said support to said base, said means providing for simultaneous vertical and horizontal adjustment of said support with respect to said base along an irregular curved path of upwardly and inwardly increasing horizontal deviation as the vertical deviation increases.

2. A device of the character set forth including a base, a standard on said base, a mounting member, a conveyor idler support rotatably mounted on said mounting member and means for adjusting said member with respect to said standard whereby said support may be moved, in a curved path of irregular pattern of progressively diminishing radius, with respect to said base.

3. A device of the character set forth including a base, an inwardly irregularly curved standard on said base, a mounting member of commensurate inwardly irregular curvature, a conveyor idler support rotatably mounted on said mounting member and means for adjusting said member with respect to said standard whereby said support may be moved, in a curved path of irregular pattern of progressively upwardly diminishing radius, with respect to said base, whereby the catenary of the conveyor belt may be altered without variation of its "D" distance.

4. A support for a flexible conveyor belt idler including a base, adapted to be secured in a fixed position adjacent the path of travel of a conveyor belt, a curved tubular standard extending generally vertically upward from said base, the curvature of said standard being irregular and of diminishing radius upwardly from said base, a support for one end of a flexible conveyor belt idler, a curved sleeve telescopically fitted within said standard, means for fixedly securing said standard and sleeve in adjusted position, the internal diameter of said standard being substantially greater than the external diameter of said sleeve.

5. A support for a flexible conveyor belt idler, including a base, adapted to be secured in a fixed position adjacent the path of travel of a conveyor belt, a curved tubular standard extending generally vertically upward from said base, the curvature of said standard being irregular and of diminishing radius upwardly from said base, a support for one end of a flexible conveyor belt idler, a curved sleeve telescopically fitted within said standard, the internal diameter of said standard being substantially greater than the external diameter of said sleeve and set screws mounted through said standard to engage said sleeve to retain said sleeve in telescopic and angular position with respect to said standard.

6. A support for flexible conveyor belt idlers including a base, a hollow inwardly curved tubular standard mounted on said base, an inwardly curved sleeve telescopically fit within said standard, said sleeve being of substantially reduced external diameter in respect to the internal diameter of the standard, and adjustable set screws threaded through said standard and engageable with said sleeve to adjust the relative telescopic position of said sleeve with respect to said standard.

References Cited in the file of this patent

UNITED STATES PATENTS

| 909,833 | Vrooman | Jan. 12, 1909 |
| 1,050,321 | Winzenburg | Jan. 14, 1913 |
| 1,599,696 | Wantz | Sept. 14, 1926 |
| 2,773,257 | Craggs et al. | Dec. 4, 1956 |
| 2,820,541 | Barnish et al. | Jan. 21, 1958 |
| 2,983,364 | Lo Presti | May 9, 1961 |